United States Patent [19]

Patrick et al.

[11] Patent Number: 5,706,483

[45] Date of Patent: Jan. 6, 1998

[54] RUN-TIME CODE COMPILER FOR DATA BLOCK TRANSFER

[75] Inventors: Stuart Raymond Patrick, Issaquah; Amit Chatterjee, Redmond, both of Wash.

[73] Assignee: Microsoft Corporation, Redmond, Wash.

[21] Appl. No.: 356,062

[22] Filed: Dec. 13, 1994

[51] Int. Cl.[6] ............................................. G06F 13/00
[52] U.S. Cl. ............................... 395/525; 395/515
[58] Field of Search ............................. 395/501, 507, 395/511, 515, 525, 842; 345/185, 189, 190, 201, 203

[56] References Cited

U.S. PATENT DOCUMENTS 4,933,878  6/1990  Guttag et al. ........................... 395/525
5,465,340  11/1995 Creedon et al. ........................ 395/846

OTHER PUBLICATIONS

"Device Driver Adaption Guide" Microsoft Corporation, 1992; Chapters 1, 2 & 10.

*Primary Examiner*—Kee M. Tung
*Attorney, Agent, or Firm*—Klarquist Sparkman Campbell Leigh & Whinston, LLP

[57] ABSTRACT

A method and apparatus for efficiently transferring a data block of bytes from a source to a destination in memory of a computer system. The method transfers bytes in multiple-byte words on word-aligned boundaries of memory as much as possible to reduce the number of fetches and writes and the number of memory cycles required to execute the transfer. For handling data block transfers of various sizes and locations, the method is implemented in a compiler that compiles different portions of code at run time into a block of code that is then immediately executed. The compiler employs a state machine stored in memory and having a plurality of states. Each state is associated with a portion of code for aligning a destination address or for transferring bytes in multiple-byte words on word-aligned boundaries. The states correspond to different starting source and destination addresses. A number of state machines are provided corresponding to the different color formats (bits per pixel) that may exists in the source and destination.

25 Claims, 8 Drawing Sheets

RUN-TIME CODE COMPILER FOR DATA BLOCK TRANSFER

FIELD OF THE INVENTION

This invention relates generally to computer graphics. More particularly, this invention relates to a method and apparatus for transferring a block of data from a source location in computer memory to a destination location using multiple-byte groups, or words, of data to reduce the transfer time.

BACKGROUND OF THE INVENTION

In the field of computer graphics, pictorial information is often stored as a bitmap, in which each pixel of an image corresponds to 1 or more bits in the bitmap. Monochrome bitmaps require only 1 bit per pixel (or "bpp"); color bitmaps require additional bits to indicate the color of each pixel. Typically, color pixels are represented by 8, 16, or 24 bits per pixel.

Often all or part of a bitmap must be moved from one location in a computer's memory (the "source" location) to another location (the "destination" location). Transfers of this type are called bitmap block transfers, or "blt"s for short, and are typically carried out by a computer's operating system in response to a function call from an application program. For example, an application program may have "drawn" a figure on a bitmap in a source memory location by changing the numeric values of the bits in the bitmap. To display the figure rapidly on the screen of a display device, the bitmap is block transferred (or "blitted") from the source memory location to the video display (destination) memory location. A display device associated with the video display memory then displays the bitmap containing the figure. The video display memory is also commonly referred to as the screen memory or frame buffer for the display device.

Often there is a need to change a bitmap as it is transferred from the source to the destination in memory. These changes might be required for a number of reasons. First, the source and destination may have different color formats for their bitmaps. For example, a bitmap in the source may represent color information with 8 bits per pixel, while a bitmap in the destination may represent color information with 16 bits per pixel. In such a case, the 8 bit per pixel information in a source bitmap must be transformed into 16 bit per pixel information in a destination bitmap at the time the block transfer occurs. (This change in format is referred to as a "conversion".) Second, even if the color formats are identical, the color values in the source bitmap may have to be changed as the bitmap is transferred to the destination. For example, if a program draws a red triangle on a source bitmap and the destination contains a yellow bitmap, the program may want the triangle to appear orange in the destination bitmap (combining yellow and red), or red (the color used to draw the triangle). It is convenient to combine the red and yellow into orange during the transfer. (This operation is referred to as "combining".) Third, the source and destination memory locations might be different sizes. For example, the source location may be a rectangle of dimension 10×10, but a program might want the rectangle transferred to the video display memory location and displayed with dimensions 20×20. Accommodating this change in size is also done during the block transfer. (This operation is referred to as "stretching".)

These block transfers of data between memory locations should be as fast as possible, since they occur frequently and involve the movement of large amounts of data. For example, in the process of opening different windows in a graphical use interface, many data blocks are transferred into the display memory to produce the windows' color, text and graphics. Therefore the slower the rate of transfer, the slower the rate at which the computer system operates.

Prior approaches for data block transfers have been inefficient. In an initial approach, the functions that performed the various operations of block transfer, converting and combining were called once for each byte of the data block to be transferred. (A byte is a group of bits such as 8, and is normally the smallest addressable segment of data in a memory. As used herein, the term "byte" means one or more bits that can be addressed as a single unit.) Data block transfers typically involve thousands of bytes. Because function calls are relatively slow, this results in a very slow transfer of the data block as the block transfer functions are called thousands of times for a data block transfer.

It was thereafter recognized that the repetitive function calls could be eliminated by creating a function that includes a run-time code compiler. The compiler generates code that imbeds the required byte transfer operation within a loop. In this second approach, a block transfer function with its code compiler must only be called once to transfer the data block from a source memory location to a destination memory location. While it takes additional time to generate the code, that additional time is more than offset by the time savings from eliminating the thousands of additional, repetitive function calls previously required.

Although the second approach is a distinct improvement over the first, both suffer from a fundamental drawback: the block transfer still occurs byte by byte. For a thousand byte block transfer, for example, the loop within the block transfer function must still be executed a thousand times. While time required to call a function a thousand times has been eliminated, the time required to execute a loop a thousand times to transfer the data block byte by byte has not.

Accordingly, an object of this invention is to transfer a data block from a source to a destination in memory more rapidly than before. Another object of the invention is to reduce the time required for transferring the data block by transferring it in multiple-byte groups or words, that may be accommodated by a particular computer system. Still another object of the invention is transfer, combine or convert a data block rapidly through the generation of run-time code, with the code adapted for transferring the data in both bytes and multiple-byte words as needed for the most efficient transfer of the data block.

SUMMARY OF THE INVENTION

In accordance with the invention, a method and apparatus for transferring a data block of bytes from a source to a destination in memory is shown and described. The method may transfer the bytes in multiple-byte words on word-aligned addresses of memory to reduce the number of fetches and writes and the number of memory cycles required to accomplish the transfer.

In a preferred embodiment of the invention, a step of the method initially fetches, from a starting address of the source, a number of data block bytes that the starting address is apart from a word-aligned address (or boundary) of memory. For example, if the starting address of the data block is memory address 19 and the nearest word-aligned memory address is 20, a single byte is fetched to align the next source address on the word-aligned boundary of 20. Further fetches are then in multiple-byte words such as 4 bytes, each fetch from a successive word-aligned memory address. In this same example, further fetches are 4 bytes each from memory addresses 20, 24, 28, and so forth. Bytes corresponding to the fetched bytes are then written to the destination. Initially, a sufficient number of bytes are written which the starting destination address is apart from a word-aligned address. For example, if the starting destination address for the data block is memory address 905, then 3 bytes are written to align the next destination address on a word-aligned boundary of 908. Further writes are then in multiple-byte words to successive word-aligned addresses of 908, 912, 916, etc.

The correspondence between the fetched bytes and the written bytes may be direct or through a conversion process. In a direct correspondence, the fetched bytes are actually written to the destination. In a conversion process, the fetched bytes are converted in some manner into other bytes that are written to the destination. Conversion typically occurs where the color formats (bits per pixel) of the source and destination differ. For example, the source may store a data block as a bitmap with 8 bits (1 byte) per pixel and the destination may stored a data block as a bitmap with 16 bits (2 bytes) per pixel. In such a case, each byte in the source is converted to 2 bytes in the destination. Any of a number of well known conversion processes may be employed for a conversion, such as a precompiled color look up table of 256 16-bit entries. A byte from the source serves as an index into the look up table, and the corresponding entry is 2 bytes for the destination.

Because the starting addresses of the source and destination may vary depending on the location of the data block to be transferred, the method is preferably implemented in code that is compiled at run time. Stored in memory is a plurality of code portions from which a block of code maybe compiled. Code is compiled from the code portions into a block for writing sufficient bytes corresponding to bytes from the source to the destination to align the destination on a word-aligned address of memory. Code is also compiled from the code portions into the block for fetching words of the data block from the source and writing words corresponding to the fetched words to the destination on word-aligned addresses of memory. The compiled block of code is then executed to transfer the data block from the source to the destination.

In a preferred embodiment of the invention, the code portions are associated with states of a finite state machine stored in memory of a computer system. A compiler determines from the starting memory addresses of the source and destination an initial state of the state machine. Code associated with the initial state for writing sufficient bytes to align the destination is then compiled. From the initial state a next state of the state machine is determined. Code associated with the next state for fetching words of the data block from the source and writing words to the destination on word-aligned addresses is also compiled.

Apparatus such as a compiler embodying the invention are also described.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
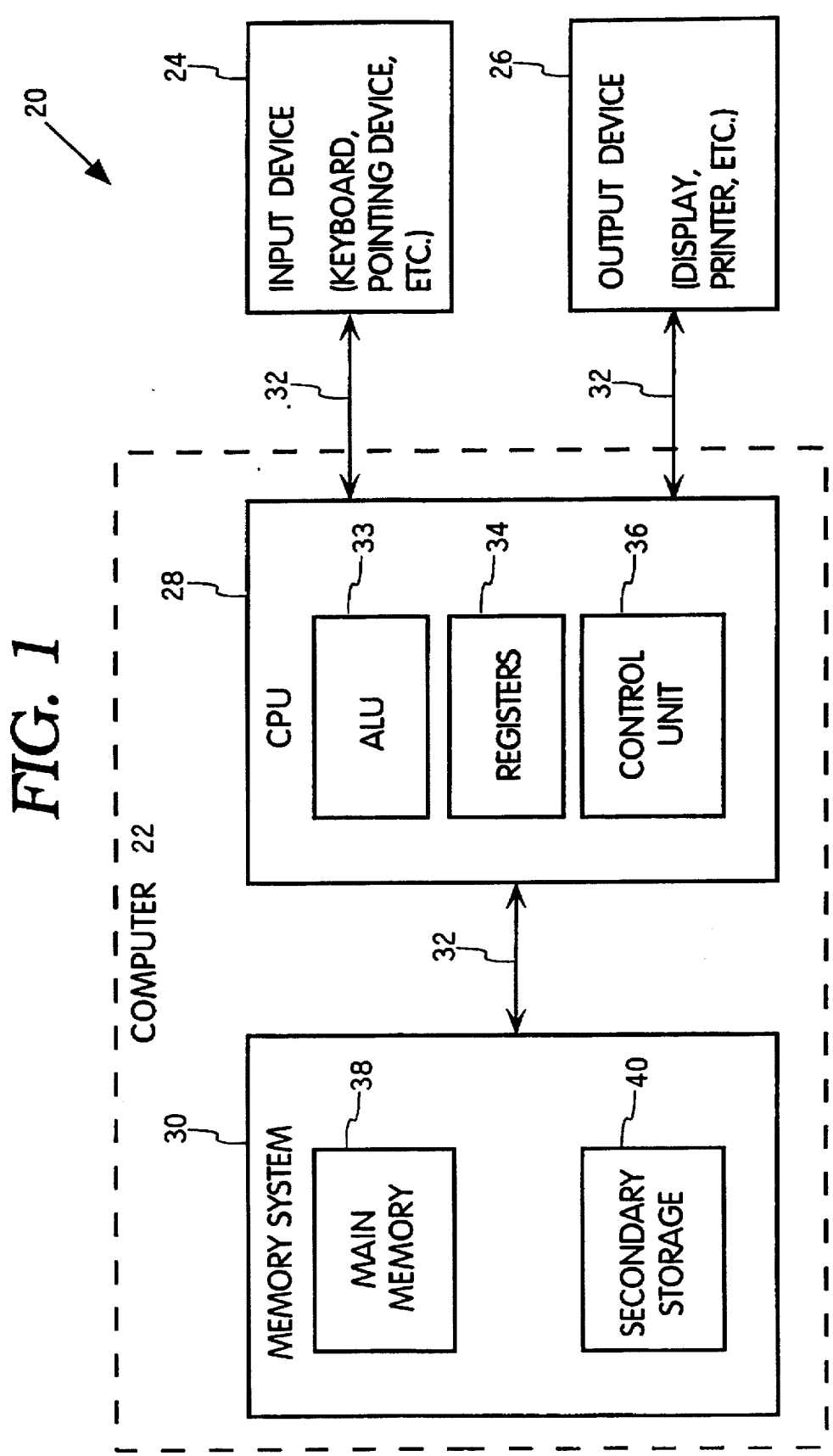
FIG. 1 is a block diagram of a computer system that may be used to implement a method and apparatus embodying the invention for transferring a data block from a source to a destination in memory.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
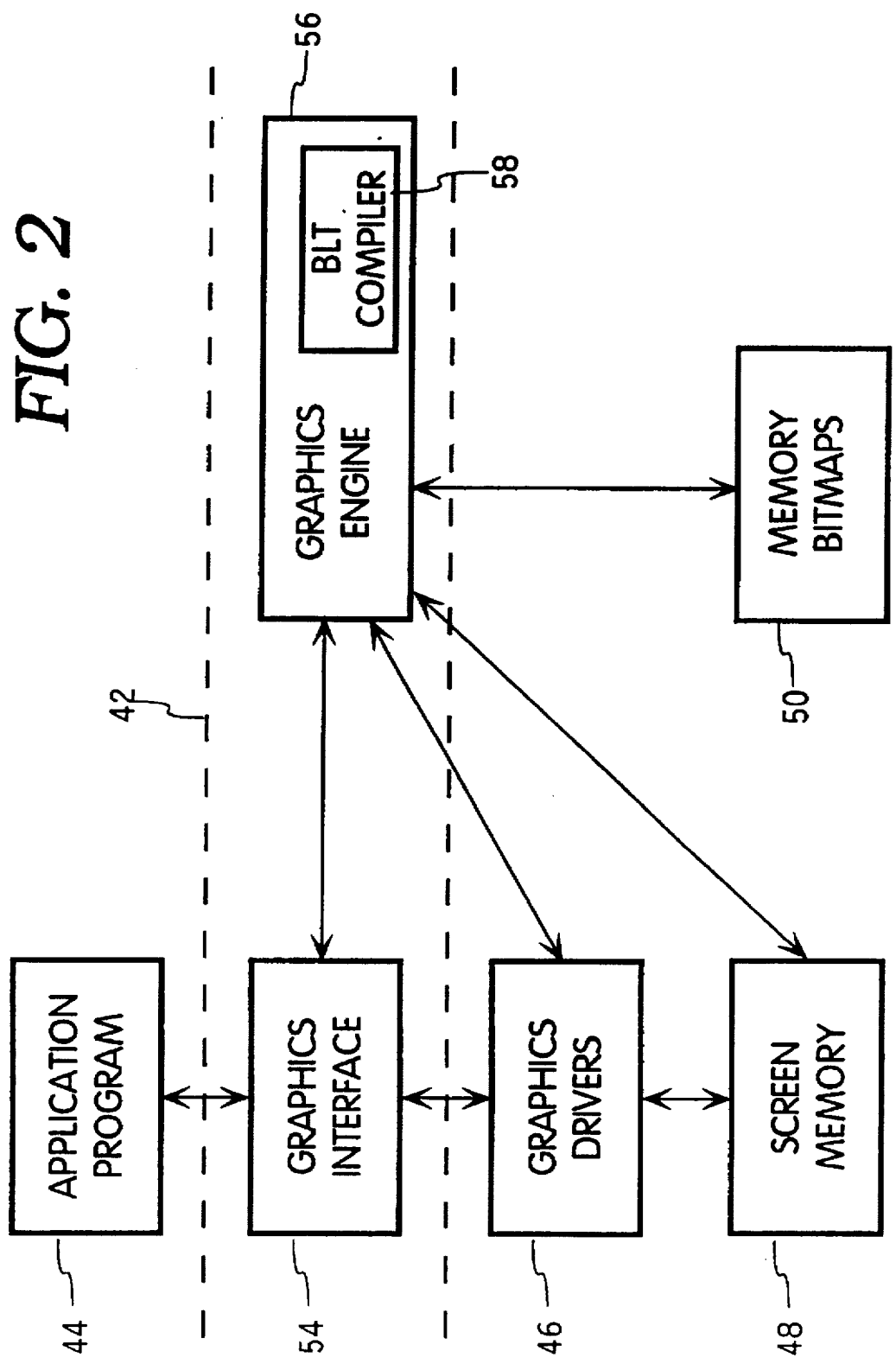
FIG. 2 is a block diagram of an application program, operating system, graphics drivers and memory within a computer system such as shown in FIG. 1.

FIG. 2 is a block diagram of a portion of an operating system 42 in communication with an application program 44 and a graphics driver 46. Operating system 42 further communicates with screen memory 48 and bitmaps 50 or other memory locations that may serve as sources and destinations in memory for a data block of bytes. Within the illustrated portion of operating system 42 are a graphics interface 54 and a graphics engine 56. Each of the blocks in FIG. 2 except for the memory is typically implemented as a module of code for a set of related functions.

In the process of transferring a data block from a source to a destination in memory, application program 44 calls a blt function in graphics interface 54, passing as parameters the location of the source and destination, the size in pixels of the data block to be transferred and a raster operation code (ROP) for logically combining the bits in the source and destination. Graphics interface 54, in turn, calls an appropriate function in graphics driver 46 which, in turn, calls an appropriate function in a graphics engine 56. Graphics engine 56 contains, among other things, a blt compiler 58 embodying the invention. Using compiler 58 in response to a call to a blt function, graphics engine 56 carries out the data block transfer from the source to the destination in memory and notifies graphics interface 54 of this transfer.

This, of course, is only a description of the preferred embodiment. The blt compiler 58 may also be contained in the graphics interface, graphics drivers, an application program or suitably elsewhere in computer system 20.

The present invention employs blt compiler 58 for rapidly transferring a data block from a source to a destination in memory. The rate of transfer is increased by transferring the data block in groups of multiple bytes, where possible, such as in 2- or 4-byte groups. The byte size of the groups that may be rapidly transferred is a function of the architecture of CPU 28 and memory 38 and varies among different computer systems. In the Intel family of microprocessors, which are used in the preferred embodiment, the more advanced microprocessors are designed to transfer information between memory and microprocessor registers in addressable data items comprised of a single byte, 2 bytes, and 4 bytes. Future versions may have 8 or more byte addressable data items. Two-byte addressable data items in Intel microprocessors are referred to as words and 4-byte addressable data items are referred to as double words. However, for the purpose of description, the term "word" is broad enough to encompass double words. "Word" should be understood to refer to a group of 2 or more bytes that may be read from or written to memory as a single addressable data item. The terms "word-aligned address" and "word-addressable boundary" are used interchangeably to refer to a memory address to which a word may be written or from which a word may be fetched.

The advantage of handling a word of multiple bytes as a single addressable data item is speed of transfer. Transferring 4 bytes by executing an instruction once may be up to 4 times as fast as transferring 4 bytes by executing an instruction 4 times. However, a word of bytes may not always be efficiently transferrable as a single data item. In the Intel 80486 microprocessor, for example, 4 bytes can be transferred as a double word to and from memory through a 32-bit register with a single memory cycle only if the memory reference is "aligned" with a 4-byte word boundary, defined as a memory address divisible by 4. Because of the way the hardware memory interface works in Intel architecture, a 32-bit operand must begin at a 4-byte word boundary, or the operand will require 2 memory cycles to read the operand. The same data transfer efficiency is true for word transfer on a 2-byte word boundary (memory address divisible by 2) and double and extended precision floating-point number transfer on memory addresses divisible by 8. Further information on this topic may be found in a number of references, including "Microsoft's 80386/80486 Programming Guide," 1991, available from Microsoft Press. A word, therefore, is a group of 2 or more bytes (4, 6, 8, etc.) that may be manipulated as a single data item.

The Basic Embodiment

Figure 3:
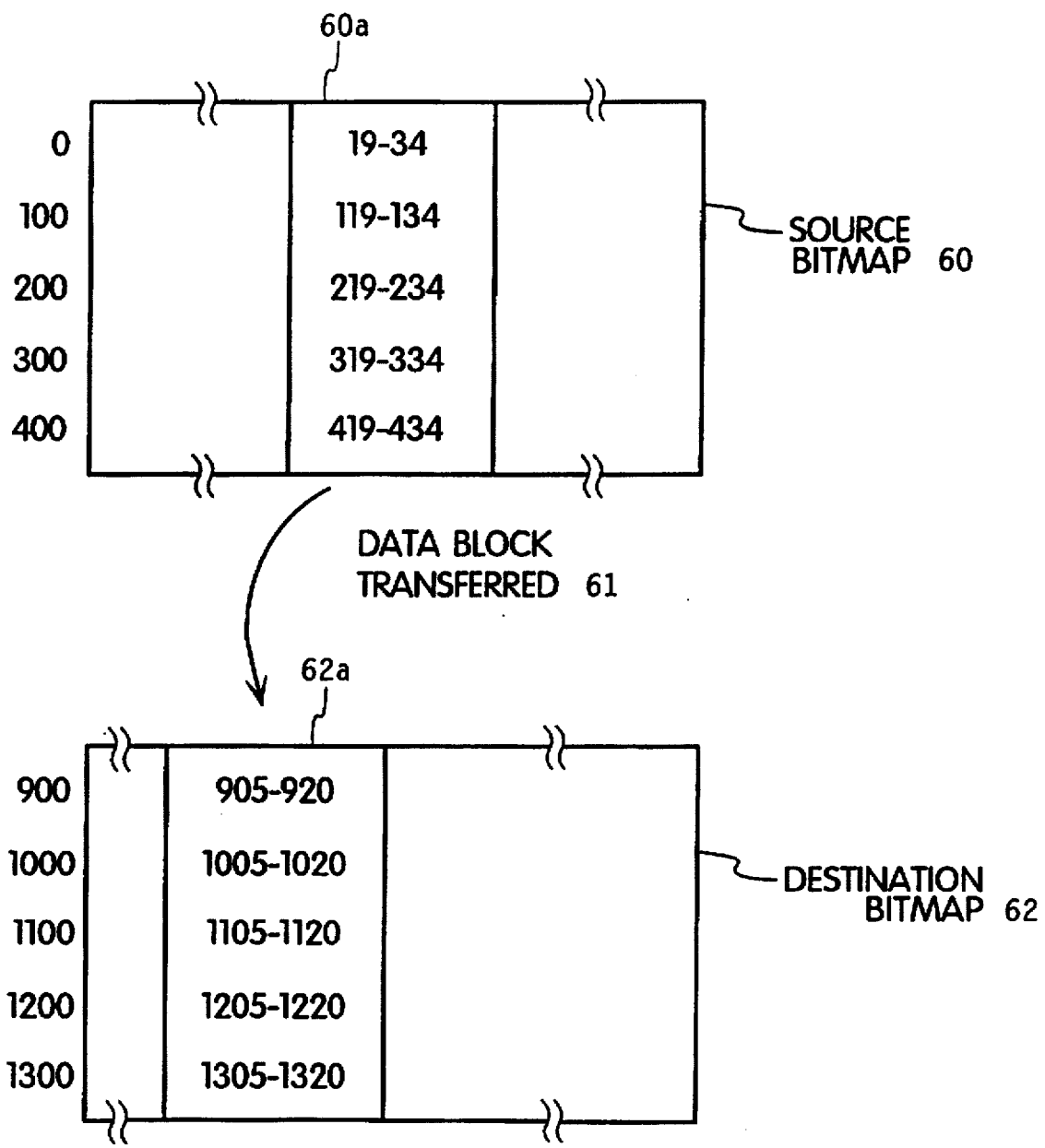
FIG. 3 is a diagram showing a process for transferring a data block from a source bitmap to a destination bitmap in memory.

Before proceeding with a description of the preferred embodiment, the following example is provided to explain what is involved in the block transfer of bytes from a source to a destination in memory. FIG. 3 is a diagram showing an 8 bpp bitmap at a source (a "source bitmap") for transfer to an 8 bpp bitmap at a destination (a "destination bitmap"). The source bitmap 60 is located at memory addresses 0–499 (decimal) and the destination bitmap 62 is located at memory addresses 900–1399. A data block 61 for transfer is contained within a rectangle 60a in source bitmap 60 and consists of 15 bytes on each of 5 consecutive scan lines at the memory addresses given in the figure. Data block 61 is to be transferred to a similarly-sized rectangle 62a in destination bitmap 62 at the memory addresses given in the figure. Each byte in data block 61 must be fetched (i.e., read) from a source address and written to a destination address. For example, the first byte of the data block has a source address of 19. This byte is to be transferred to a destination address of 905. The next byte for transfer has a source address of 20 and a destination address of 906, and so forth.

The means for moving a block of pixels such as represented by data block 61 from 1 memory location to another is known as a bit block transfer, or bitblt. Typically bitblts are handled by functions in the operating system, such as the BitBlt function in the Windows™ operating system. The memory locations of the source and destination bitmaps and the designation of the data block to transfer are parameters to the function. The bitmaps themselves may be created by a user in a number of ways, and typically are created by operating system 42 so that each scan line of a bitmap ends on a word-aligned address of memory (e.g., by padding each line with additional memory locations as necessary).

When implemented within a function, blt compiler 58 requires the following information: (1) the addresses of the start of the source and destination bitmaps; (2) the x,y pixel coordinates designating the upper-left point of the rectangle to be transferred (from which the starting address of the data block may be determined); (3) the width and height of the rectangle to be transferred in pixels (from which the number of bytes in the data block may be determined); (4) the x,y coordinates in pixels designating the upper-left location in the destination where the source rectangle should be transferred to; and (5) a ROP code for how to combine the source and destination pixels with a pattern when doing the transfer. Blt compiler 58 then generates code to transfer the data block from a source bitmap to a rectangle in the destination bitmap.

Figure 4:
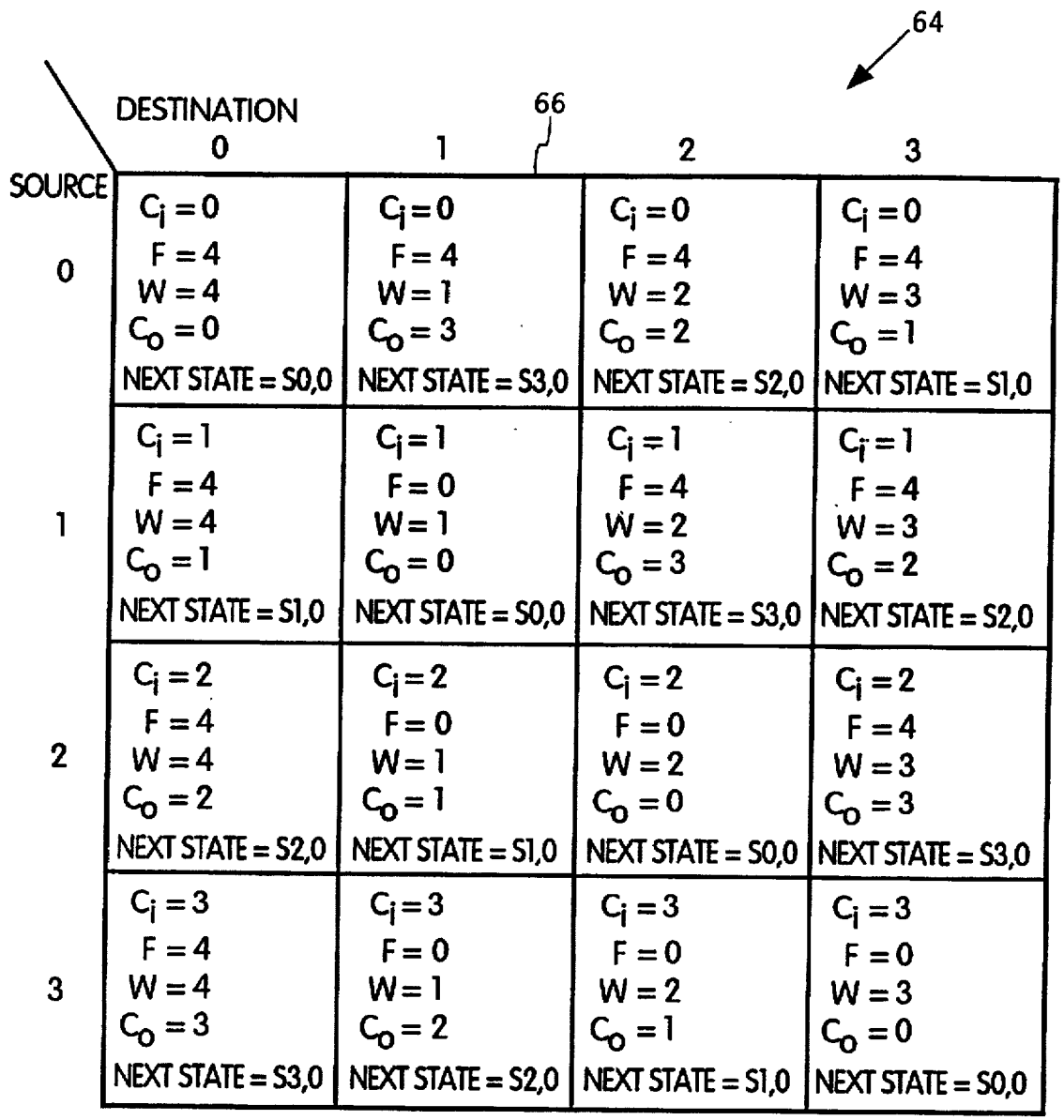
FIG. 4 is a diagram of a finite state machine embodying the invention.

With this as background, reference is now made to a state table 64 shown in FIG. 4. State table 64 represents a finite state machine in main memory 38 for use in the preferred embodiment. Finite state machines ("FSM") have a finite set of states, a set of functions they perform at each state, and a set of transition arcs leading from a state to another state. The transition arcs use transition variables to determine what state the FSM should move to after it has performed the functions of its current state. FSM's are "determinable," meaning that, for a given state and a given set of transition values, the FSM can move to at most one other state. In state table 64, each state 66 of the state machine is represented by a square.

Each square of state table 64 is identified by a row and column address such as S0,0 for state 0,0. The rows of the table represent the number of bytes the first byte of the data block in the source bitmap is apart from a word-aligned address (an address divisible by 4). As will be described, this number is also the number of bytes that are temporarily stored in the transfer process. The columns of the table represent the number of bytes that the destination address for the data block is apart from a word-aligned address in memory 38. A square (and thus a state) is thus uniquely identified by a set of row and column numbers such as 1,0.

Each square in the table has 4 state variables: $C_i$=Carry In; $C_o$=Carry Out; F=Number of bytes to fetch; and W=Number of bytes to write. $C_i$ is the number of bytes from the data block that are prefetched from memory at the starting address in the source and stored temporarily in the transfer process; the value of $C_i$ corresponds to the state's row address. F is the number of bytes to fetch from the current source address. F=4 is a fetch of 4 bytes from a word-aligned address in memory. W is the number of bytes to write to the current destination address. W=4 is a write of 4 bytes to a word-aligned address in memory. $C_o$ is the number of bytes that remain stored temporarily after bytes have been written to the destination. As will be seen, $C_o$ becomes $C_i$ for the next state as the state machine transitions from one state to another.

Values for the state variables for each state of table 64 may now be determined by inspection. Following are examples for a few of the states. In S0,0, both the starting source address and destination address are aligned. No prefetch is required and $C_i$=0. four bytes are fetched from the source address (F=4) and are written to the destination address (W=4). There are no temporarily stored bytes ($C_o$= 0), and the state machine remains in a steady state S0,0.

In S0,1, the starting source address is aligned, but the starting destination address is 1 byte away from a 4-byte word boundary. No prefetch is required because of the source address alignment ($C_i$=0). 4 bytes are fetched (F=4) from the source address and 1 byte is written to the current destination address (W=1) to align the next destination address. This leaves 3 temporarily stored bytes that are carried out ($C_o$=3), taking the state machine to the next state of S3,0.

In S1,1, the starting source and destination addresses are each 1 byte spaced from a double-word boundary. One byte is prefetched ($C_i$=1) to align the next source address with a 4-byte word boundary. However, no bytes are fetched (F=0), because only 1 byte (the prefetched byte) must be written to the current destination address to align the next destination address with 4-byte word boundary (W=1). Both the starting and destination addresses are now aligned, and there are no temporarily stored bytes ($C_o$=0). The next state is S0,0.

The other states of table 64 can be similarly determined. In each of them, $C_i$ is the number of bytes that must be prefetched to align the next source address with a word boundary divisible by 4; F is the number of bytes (either 0 or 4) that must be fetched to assure there are sufficient bytes to write to the destination address to align the next destination address; W is the number of bytes that are actually written to align the destination address; and $C_o$ is the number of bytes left in temporary storage after writing bytes to an address in the destination. The next state is then determined by the value of $C_o$, and is always a steady state in the leftmost column of FIG. 4.

In the present embodiment, the state machine is an algorithm implemented in code within blt compiler 58. Each of the states of the state machine contains a portion of code for the fetching and writing of bytes, for evaluating $C_i$, and for transitioning to a next state. An initial state is selected by combining the initial value of $C_i$ from the prefetch and the number of bytes the starting address in the destination is apart from a word-aligned address into an index. This index is then used to select the initial state from a look-up table.

State machines, which are stored as files accessible to blt compiler 58, may exist for a number of color formats. For example, state table 64 represents a state machine where both the source and destination bitmaps have an 8bpp format. As will be described, other state machines are required for other color formats.

Figure 5:
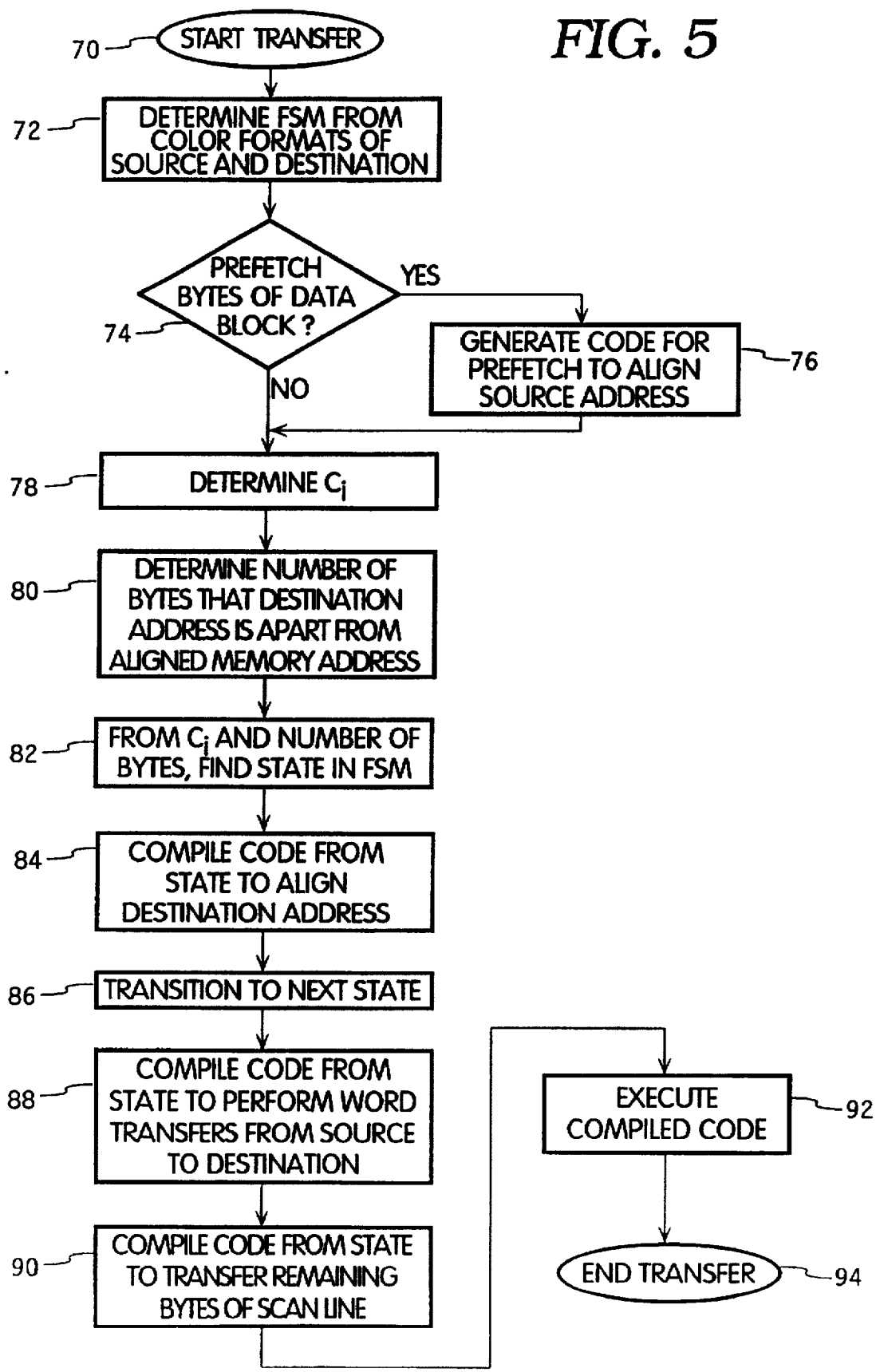
FIG. 5 is a flow chart of a method embodying the invention for compiling run-time code for a data block transfer.

A method for compiling a block of code from the code portions memory to perform a data block transfer is illustrated in FIG. 5. To aid in understanding, the method will be described with reference to the example of FIG. 3 and the state table of FIG. 4. Upon a request to initiate a data block transfer (70), blt compiler 58 determines the appropriate state machine from the color formats of the source and destination in memory (72). Although not explicitly shown in FIG. 5, the compiler at this point also sets up variables as loop counters for inner and outer loops. The inner loop processes bytes in each scan line, and the outer loop moves from one scan line to the next in the data block. For the data block of FIG. 3, loop initialization includes determining the number of 4-byte words in a scan line and the number of scan lines in the data block, and then initializing loop counters to reflect these numbers.

Compiler 58 also determines whether a prefetch is required to align the bytes of the data block to a source address (74). If so, the size of the prefetch is computed and the code for performing the prefetch is generated (76). An initial value of $C_i$ is then computed (which may be 0 to 3) (78). In the data block of FIG. 3, the initial source address is 19, requiring a prefetch of 1 byte to align the next source address with the aligned memory address of 20. The number of bytes the starting destination address is apart from an aligned memory address is also computed (80). In FIG. 3, the starting destination address is 905, 3 bytes away the aligned memory address of 908. From $C_i$ and the number of bytes, an initial state in the state machine (such as represented by state table 64) is determined (82). In the data block of FIG. 3, the initial state in table 64 is 1, 3.

The blt compiler then compiles code from the initial state for aligning the next destination address with a word-aligned address in memory (84). In the example, the values of the state variables in state 1, 3 indicate that the code portion associated with the state fetches 4 bytes from the source address (F=4), writes 3 bytes (the prefetched byte and the first 2 of the fetched bytes) to the destination address (W=3) and stores temporarily the second pair of the fetched bytes for transfer to the next destination address ($C_o$=2). For the data block of FIG. 3, this means the code will fetch 4 bytes from source address 20 and write 3 bytes to destination address 305. The following fetches from the source address (the next being memory address 24) and writes to the destination address (the next being memory address 908) are now aligned with 4-byte word boundaries in the memory.

The initial state also generates code to transition to a next state in which the number of bytes the next destination address is apart from a word-aligned boundary is zero (86). The next state, of course, may be the initial state of the starting address of the destination is a word-aligned address. In the present example, state 1, 3 provides code to transition to state 2, 0. This state transition occurs because the value of $C_i=C_o=2$ and the number of bytes the next destination address is spaced away from a double-word boundary is zero.

The state variables in state 2, 0 indicate that this state provides code for fetching 4-byte words (F=4) from the source address and writing 4-byte words (W=4) to the destination address (88). The number of bytes stored temporarily during the transfer remains at 2 ($C_o=C_i=2$) and the next state is again is state 2, 0. A state whose next state is itself a steady state, and the inner loop described above, is created in the code when a steady state is entered.

Blt compiler 58 also utilizes code associated with the chosen steady state for writing the remaining bytes in a scan line (which are fewer than 4) from the source to the destination (90). Each steady state in the state table provides this code portion from among templates of code for the state. There are 4 templates for each steady state, adapted to transfer the remaining bytes of the scan line, 1 to 34 bytes.

Blt compiler 58 completes the code compilation by adding code for jumping to successive scan lines of the data block, thereby completing the outer loop, and by adding code for exiting the outer loop.

The compiled code is then preferably executed immediately (92) to transfer the data block from the source bitmap to the destination bitmap. Upon completion of the transfer, execution is returned to the calling environment (94).

Figure 6:
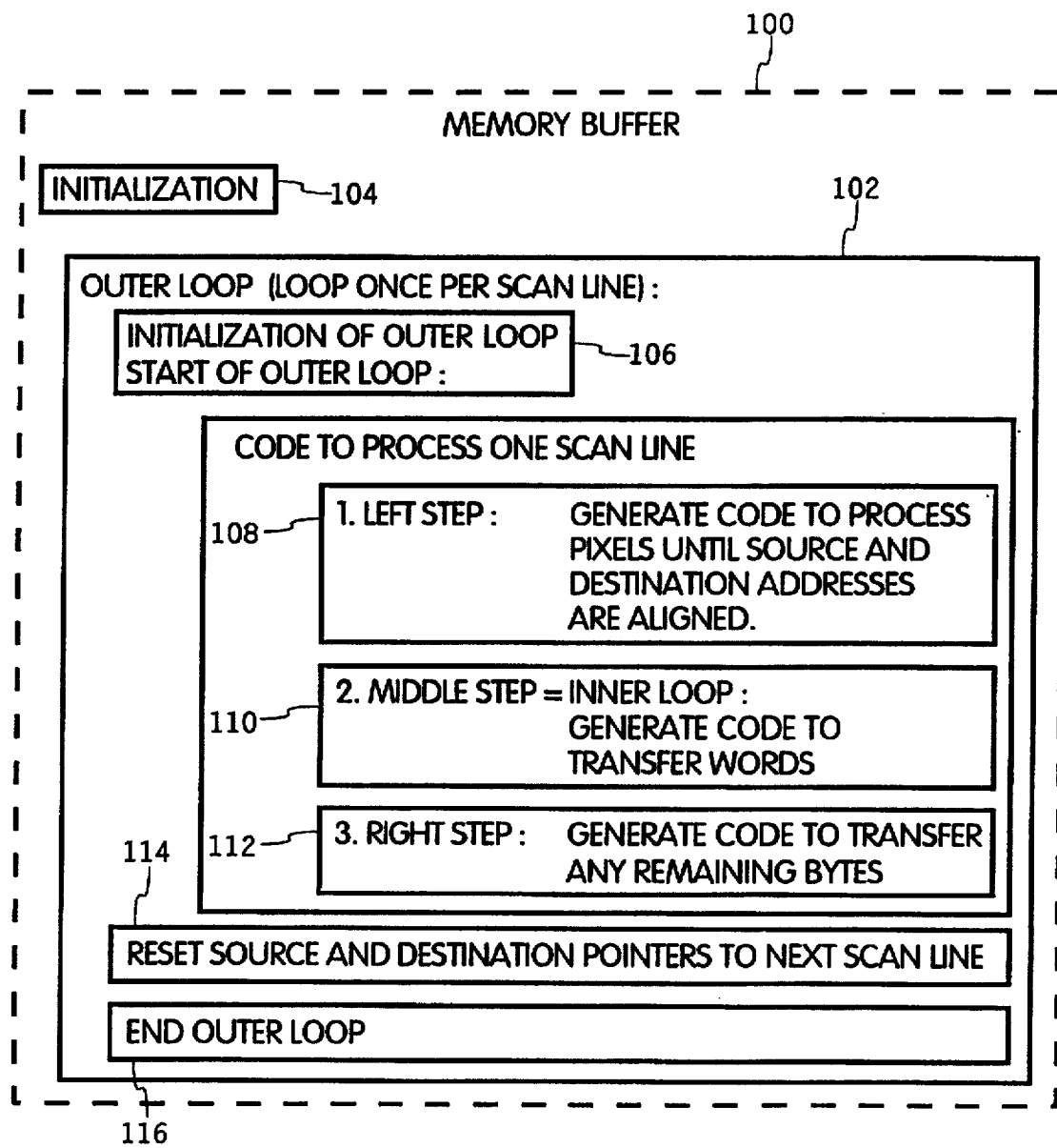
FIG. 6 is a diagram of code compiled in accordance with a method embodying the invention.

Code compiled according to a the described method is illustrated in the diagram of FIG. 6. As mentioned above, the compiled code has a 2-loop structure, with the code stored in a memory buffer 100 for execution immediately after compilation. An outer loop 102 controls the processing of the scan lines of the data block being transferred, and an inner loop controls the processing of the bytes within a scan line. The compiled code contains conventional initialization code 104 for linking the compiled code to the calling environment. Outer loop 102 includes control code 106 for initializing loop control variables such as a counter representing the number of scan lines and a variable representing the number of bytes in a scan line. The control code 106 for the outer loop also establishes an address that marks the start of the outer loop.

The code for processing one scan line has three portions: a left step 108, a middle step 110 and a right step 112. These steps process the left, middle and right portions of a scan line, respectively. Left step 108 performs two tasks. First, the left step code performs the pre-fetch that aligns the next source address to a word boundary; the number of bytes prefetched is stored in $C_i$. Second, the left step calls a state of the state machine to provide code for aligning the next destination address on a word boundary. Because left step 108 provides code to process only enough bytes to align the destination address on a word boundary, the left step code may transfer less than 4 bytes from the source bitmap to the destination bitmap.

Middle step 110 is the inner loop of the compiled code representing a steady state of the state machine. It is the code for transferring bytes from the source bitmap to the destination bitmap in 4-byte words using word aligned memory addresses. The code of middle step 110 performs the following sequence of operations: (a) fetch 4-byte words from the designated scan line within the source bitmap; (b) if required, convert the source bytes to the color format of the destination; (c) if required, call a raster operation function to perform a raster operation to apply a pattern to the converted source bytes or to the bytes in the destination; and (d) transfer the resulting bytes to the destination in 4-byte words.

Right step 112 provides code for transferring any remaining bytes in the scan line to the destination bitmap, and is selected by compiler 58 from one of a number of templates associated with each steady state.

Blt compiler 58 also generates code 114 to reposition source and destination address pointers to point to the next scan line of the data block. In the example of FIG. 3, this repositioning involves changing the source address pointer to point to memory address 119 and changing the destination address pointer to point to address 1005 of the next scan line, then to 219 and 1105, etc. Code 116 completes the outer loop, decrements the scan line counter in the outer loop and tests if the counter has reached zero to exit the loop.

Figure 7:
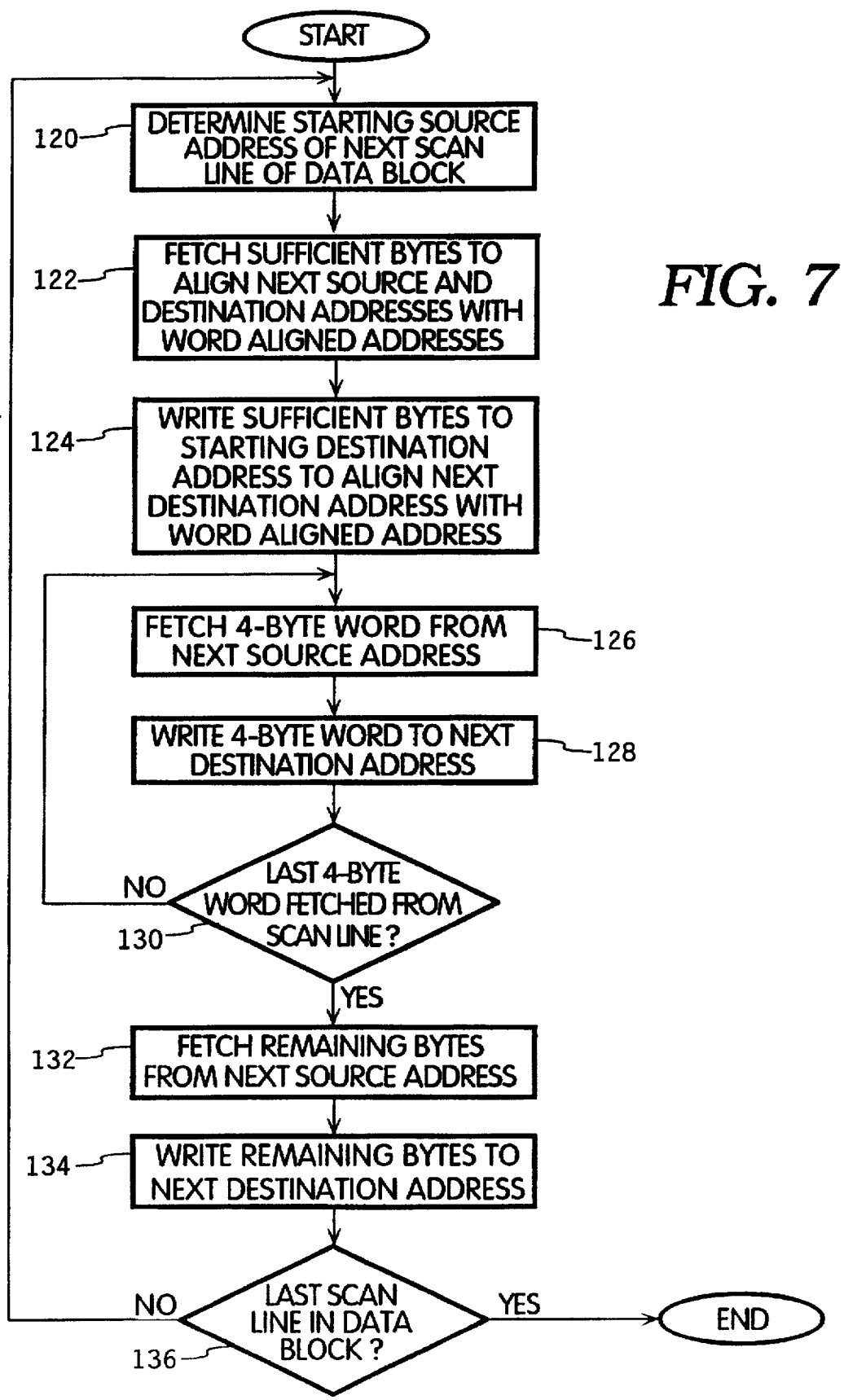
FIG. 7 is a flowchart of a method embodying the invention for transferring a data block from a source to a destination in memory.

Although the compilation of code described above is a novel and valuable method for providing the means for a data block transfer, the method of transfer itself is also significant and may be practiced independent of the blt compiler. FIG. 7 is a flowchart showing a preferred embodiment of such a method. A first step 120 determines the starting source address of the next scan line of a data block to be transferred from a source bitmap to a destination bitmap. This information may be provided in a number of ways, such as in parameters to a BitBlt function. In the present embodiment the next scan line is the first scan line of the data block and the starting address is the lowest address in the scan line, such as memory address 19 in the example of FIG. 3. Other orders of selection may also be used.

A second step 122 then fetches sufficient bytes from the starting source address to align the next source address with a 4-byte word-aligned address of memory 38. Step 122 also includes fetching sufficient bytes from the starting address in the source for aligning the next destination address with a 4-byte word-aligned address of the memory. To accomplish both of these tasks, step 122 may make multiple fetches. For example, using the data block of FIG. 3, a fetch of one byte is made to align the next source address 20 with a 4-byte word boundary. A second fetch of 4 bytes is then made to provide sufficient bytes with which to write 3 bytes to align the source address 908 with a 4-byte word boundary. The second fetch, however, is unnecessary in those circumstances where there are sufficient bytes in the first fetch with which to align the destination address. For example, if the starting source address is 907 rather than 905, the one byte initially fetched is sufficient for aligning the next destination address of 908 with a 4-byte word boundary.

The method of transfer may be implemented in a number of ways. In the present embodiment, it is implemented with registers 34 within CPU 28. One register stores bytes from the first fetch, such as the BL register in an Intel 80486 microprocessor. Another register, such as the 4-byte EAX register, then is used to fetch 4-byte words from the data block at a word aligned address. As noted, however, this second fetch is only required if the first fetch does not yield sufficient bytes with which to align the destination address.

In the next step 124, sufficient bytes corresponding to the fetched bytes from the source are written to the starting address of the destination address to align the next destination address with a 4-byte word-aligned address of memory 38. Depending upon the color formats of the source and destination, the correspondence may be direct or indirect through a conversion process. In direct correspondence, the color formats of the source and destination are the same, and typically the fetched bytes are actually written to the destination. In a conversion process, the color formats of the source and destination differ. The source bytes must somehow be converted to fewer or more bytes of bits per pixel in the destination. The fetched bytes may be truncated, expanded, used as indices into a color look up table, or otherwise converted into other bytes for the destination. For example, if the color format of a source bitmap is 8 bpp and the color format of a destination bitmap is 16 bpp, then each byte of the source must be converted to 16 bits. A well known conversion technique in this case is a look up table. A table of 256 entries of 16 bits each is precompiled and stored in memory. Each 8-bit byte of a data block in the source is an index into the table. The entry that corresponds to the index is 16 bits that are written to the destination. With an understanding that this correspondence exists, further references to the writing of fetched bytes includes the writing of the actual bytes or the writing of bytes corresponding to the fetched bytes through a conversion process.

Whatever the manner of correspondence, the bytes are written in the order the corresponding bytes are fetched. Thus, in the present embodiment, any bytes that may be stored in the BL register are written first. They may be written directly from the BL register if the number of bytes required for aligning the destination address is the same as the number in the BL register. Or they may be written as part of a 4-byte word formed with bytes in the EAX register if additional bytes are required. The bytes in the BL register and EAX register may be combined to form 4-byte words in a number of ways, such as by shifting the bytes in the BL register into the least significant bytes locations of the EAX register. The bytes shifted out of the EAX register are then stored for combining with the next bytes fetched into the EAX register.

The method now employs a inner loop composed of steps 126, 128 and 130 to transfer bytes in the scan line in 4-byte words at word-aligned addresses. In step 126, a 4-byte word is fetched from the next source address of the scan line, which is aligned with a 4-byte word boundary of memory 38. In step 128, a 4-byte word is written to the next destination address of the scan line, which is also aligned with a 4-byte word boundary of the memory. As in step 124, this 4-byte word is composed of any bytes temporarily stored from a previous fetch plus the least significant bytes of the present fetch. In some circumstances there may be no temporarily stored bytes. Where both the source and destination start on the address relative to a word aligned boundary (i.e. both 0, 1, 2, or 3 away from the boundary), there is no need for temporarily storing bytes, other than in the first fetch. In step 130, a check is made to determine if the current 4-byte word being fetched is the last in the current scan line. If not, then another 4-byte word is fetched and steps 126–130 repeat.

If yes, then the remaining bytes in the scan line, which are fewer than 4, must be fetched from the next source address and written to the next destination address. Steps 132 and 134 perform this last fetching and writing of the remaining bytes in the scan line. In the present embodiment, these remaining bits are simply fetched into a register and written to the next destination address.

At step 136, a check is made to determine if the current scan line is the last scan line in the data block to be transferred. If no, steps 120–136 are repeated until all scan lines of the data block are transferred.

FIG. 7, it should be emphasized, shows only the preferred embodiment of the method. The method may be used for words having fewer or more bytes, depending upon the microprocessor or other CPU 28 in the computer system 20.

Transfer and Conversion

In the examples of FIGS. 3 and 4, the source and destination bitmaps each had the same color formats of 8 bpp. The process of transferring a source to a destination bitmap is more complex if the source and destination bitmaps have different color formats. The color values of the source bitmap must then be converted to color values in the destination bitmap such as by the use of a color look up table described above. Blt compiler 58 may support multiple bpp formats such as 1, 4, 8, 15, 16, 24, and 32 bpp. For these 7 alone, there are 7×7=49 different FSM's employed by the Blt compiler. For example, if a source bitmap stores color information with 16 bpp, and the destination bitmap requires color information with 24 bpp, then the appropriate FSM would have a 16×24 state table.

Figure 8:
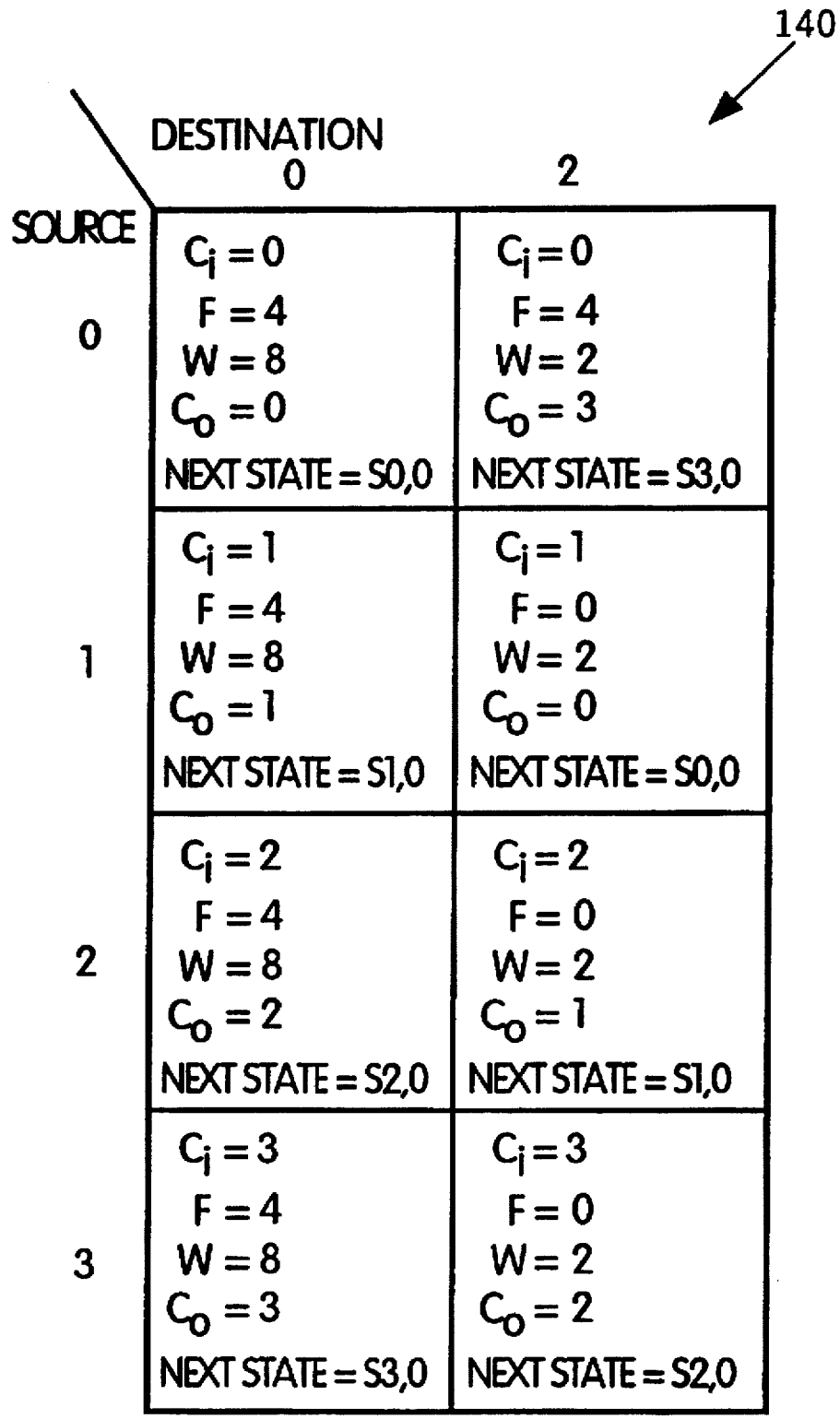
FIG. 8 is a diagram of another finite state machine embodying the invention.

The process for creating these state tables and providing the associated code is similar to the process for creating the state table 64 of FIG. 4. FIG. 8 is an example of an 8×16 state table 140 with 8 bpp in the source bitmap and 16 bpp in the destination bitmap. Table 140 has only two columns because each pixel in the destination bitmap requires a 2-byte word. By design, all destination addresses are either 0 bytes or 2 bytes away from a 4-byte word boundary. However, since the source bitmap stores its pixel information in 8 bpp, the source address may be from 0–3 bytes away from a 4-byte word boundary. The 8×16 table therefore has 8 entries.

In completing state table 140, note that the $C_i$, F, W, and $C_o$ values are in bytes. A byte represents 1 pixel for the source but only ½ of a pixel for the destination. To write 4 pixels from the source bitmap to the destination bitmap, 4 bytes must be read from the source address but 8 bytes must be written to the destination address. The bytes written to the destination correspond to the fetched bytes through a conversion process such as the look up table previously described.

Entries for table 140 can be determined by inspection. In state S0,0, for example, both the starting source and destination addresses are aligned. $C_i=0$ since no prefetch is required to align the source address on a 4-byte word boundary. Four bytes are fetched (F=4) and 8 bytes are written (W=8). $C_o=0$, and the next state is S0,0.

In state S1,0, the starting source address is 1 byte away from a 4-byte word boundary, requiring a prefetch of 1 byte to align the next source address with a double-word boundary ($C_i=1$). Four bytes are fetched (F=4) from the source address and 8 bytes are written (W=8) to the destination address. The prefetched byte is employed first in the conversion process. Then the first 3 of the 4 bytes that are fetched are converted, providing the 8 bytes for the destination bitmap. $C_o=1$, and the FSM remains in S1,0.

In S0,2, the starting source address is aligned with a 4-byte word boundary, requiring no prefetch ($C_i=0$). Four bytes are fetched (F=4) from the source address. However, only 2 bytes are written to the destination address since it is 2 bytes away from a 4-byte word boundary. Because of the conversion process, only one byte of the fetched bytes is converted to provide the 2 bytes that are written to the destination address. This leaves 3 bytes that are carried out ($C_o=3$). The next state is thus S3,0.

As with state table 64 depicted in FIG. 4, the left column in state table 140 is a steady-state column, since once the FSM enters 1 of the states in that column, the state never changes.

It can be seen then that the operation of blt compiler 58 is the same whether or not the source or destination have equivalent color formats. All that changes is nature of the correspondence between the fetched bytes and the written bytes and the particular code associated with states of the various FSMs.

Combining the Source and/or Destination Bitmaps with a Pattern

In a function-based embodiment of the invention, one of the parameters passed to blt compiler 58 is a raster operation (ROP). ROPs are used to perform logical operations on combinations of a source pixel, a pattern, and a destination pixel. In the present embodiment each ROP is one byte, providing 256 possible ways to combine the source, pattern, and destination. ROPs are used to implement brushes, in a manner well known in the art. For example, if the source bitmap is yellow, and a user draws a rectangle with a red brush, a ROP might transfer only the brush color to the destination bitmap. In this case a red rectangle appears. Or a ROP might combine the source and brush colors. In that case an orange rectangle appears.

ROPs may be implemented in blt compiler 58 through a raster routine that is called after the bytes of the data block have been fetched and converted to bytes in the destination. The routine provides code to perform the appropriate logical combination of the source, pattern and destination. In the Intel 386 family of microprocessors, the raster routine works as follows. The source pixels are always in a given register, such as EAX. The pattern is in a different register, such as EDX. The destination is in still another register, such as ECX. The raster routine applies the ROP to the restored in d the result is stored in EAX. The routine generates code to perform a sequence of logical operations on those registers. The code is generated from a table. The table has 256 entries, from 0–255. The ROP code is used as an index into the table. Each entry in the table contains the instructions to perform the required logical operations, and those instructions are moved to memory buffer 100 without change. When the raster routine is finished, the result that is stored in EAX can be moved to the destination bitmap.

In the preferred embodiment the raster routine applies the ROP to 4 bytes (or entire 32-bit registers), rather than to 1 byte as in previous versions. This implementation is 4 times faster because all 4 bytes are done in parallel, or in the same amount of time it previously took to work perform the raster operation on 1 byte.

Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. Word lengths and word aligned boundaries may vary, depending upon the hardware of the computer system 20. In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A method of transferring bytes of a data block from a source to a destination in byte and word-addressable memory, the method comprising the following steps:
   fetching, from a starting address of the source in memory, a number of data block bytes that the starting address is apart from a word-aligned address of memory;
   fetching, from successive word-aligned addresses of the source, words of data block bytes;
   writing, to a starting address of the destination in memory for the data block bytes, a number of bytes corresponding to bytes fetched from the source, which number the starting destination address is apart from a word-aligned address of the memory; and
   writing, to successive word-aligned addresses of the destination, words corresponding to words fetched from the source.

2. The method of claim 1 wherein the bytes and words written to the destination correspond directly to bytes and words from the source.

3. The method of claim 1 wherein the byte and words written to the destination correspond through a conversion process to bytes and words from the source.

4. The method of claim 3 wherein the conversion process comprises a look up table that supplies one or more bytes to the destination corresponding to one or more bytes from the source.

5. The method of claim 3 wherein the conversion process comprises truncating one or more bytes from the source to supply corresponding bytes to the destination.

6. The method of claim 3 wherein the conversion process comprises expanding one or more bytes from the source to supply corresponding bytes to the destination.

7. The method of claim 1 wherein a word is four bytes in length, and a word-aligned address is a memory address divisible by four.

8. The method of claim 1 wherein a word is 2 bytes in length, and a word-aligned address is a memory address divisible by 2.

9. Apparatus for transferring bytes of a data block from a source to a destination in memory, comprising:
   means for fetching a number of data block bytes from a starting address of the source in memory, which number the starting source address is apart from a word-aligned address of memory;
   means for fetching words of data block bytes from successive word-aligned addresses of the source in memory;
   means for writing to a starting address of the destination in memory for the data block bytes a number of bytes corresponding to bytes fetched from the source, which number the starting destination address is apart from a word-aligned address of the memory; and
   means for writing words corresponding to words fetched from the source to successive word-aligned addresses of the destination in memory.

10. The apparatus of claim 9 wherein the means for fetching words comprises a programmed central processing unit of a computer.

11. The apparatus of claim 10 wherein the central processing unit contains registers for fetching words.

12. The apparatus of claim 9 wherein the means for writing words comprises a programmed central processing unit of a computer.

13. The apparatus of claim 12 wherein the central processing unit contains registers for writing words.

14. The apparatus of claim 9 wherein the bytes and words written to the destination correspond directly to bytes and words from the source.

15. The apparatus of claim 9 wherein the byte and words written to the destination correspond through a conversion process to bytes and words from the source.

16. The apparatus of claim 15 wherein the conversion process comprises a look up table that supplies one or more bytes to the destination corresponding to one or more bytes from the source.

17. The apparatus of claim 15 wherein the conversion process comprises truncating one or more bytes from the source to supply corresponding bytes to the destination.

18. The apparatus of claim 15 wherein the conversion process comprises expanding one or more bytes from the source to supply corresponding bytes to the destination.

19. The apparatus of claim 9 wherein a word is four bytes in length, and a word-aligned address is a memory address divisible by four.

20. The apparatus of claim 9 wherein a word is 2 bytes in length, and a word-aligned address is a memory address divisible by 2.

21. Apparatus for transferring bytes of a data block from a source to a destination in memory, comprising:

(a) a medium for containing instructions; and (b) instructions stored on the medium for:

from a starting address of the source in memory, fetching a number of data block bytes that the starting address is apart from a word-aligned address of memory;

from successive word-aligned addresses of the source, fetching words of data block bytes;

to a starting address of the destination in memory for the data block bytes, writing a number of bytes corresponding to bytes fetched from the source, which number the starting address is apart from a word-aligned address of the memory; and to successive word-aligned addresses of the destination, writing words corresponding to words fetched from the source.

22. The apparatus of claim 21 wherein the medium is a magnetic recording material.

23. The apparatus of claim 21 wherein the medium is memory.

24. The apparatus of claim 12 wherein the medium is disk storage.

25. The apparatus of claim 24 wherein the medium is a semiconductor device.

* * * * *